Dec. 7, 1937.  D. L. REYNOLDS  2,101,344
CARRIER VEHICLE STRUCTURE
Filed Feb. 11, 1935  11 Sheets-Sheet 1

INVENTOR.
DAMIAN L. REYNOLDS
BY John Flam
ATTORNEY.

INVENTOR.
DAMIAN L. REYNOLDS
BY John Flam
ATTORNEY.

Dec. 7, 1937.   D. L. REYNOLDS   2,101,344
CARRIER VEHICLE STRUCTURE
Filed Feb. 11, 1935   11 Sheets-Sheet 8

Fig. 14.

INVENTOR.
DAMIAN L. REYNOLDS
BY
ATTORNEY.

Dec. 7, 1937.   D. L. REYNOLDS   2,101,344
CARRIER VEHICLE STRUCTURE
Filed Feb. 11, 1935   11 Sheets-Sheet 9

INVENTOR.
DAMIAN L. REYNOLDS
BY John F Lane
ATTORNEY.

Patented Dec. 7, 1937

2,101,344

UNITED STATES PATENT OFFICE 2,101,344

CARRIER VEHICLE STRUCTURE

Damian L. Reynolds, Burlingame, Calif.

Application February 11, 1935, Serial No. 6,049

7 Claims. (Cl. 105—409)

This invention relates to carrier vehicles, such as railroad cars; and more particularly to the construction of the side and end walls.

It is one of the objects of this invention to provide a metal superstructure for such cars, which is light and yet has great strength.

It is another object of this invention to provide a construction of this character that is inexpensive without sacrifice of strength and durability.

It is another object of this invention to provide a structure of the character specified, of sheet metal formed to provide columnar construction, whereby substantially standard structural forms may be used, which are capable of being made with great accuracy, in shops equipped with appropriate machinery and tools.

It is still another object of this invention to provide units of this character that can be quickly assembled by the purchaser, without the necessity of using rivets or any special parts.

It is still another object of this invention to make it possible easily to reclaim these sheet metal parts without loss or damage for additional use in the event that the vehicle is rebuilt.

It is another object of this invention to provide simplicity in general for vehicle constructions.

It is still another object of this invention to make it possible to coat or treat the sections or units for protection and appearance, economically and easily.

It is still another object of this invention to provide a structure for the side and end walls of railroad vehicles, to which inner wearing materials or heat insulation (for refrigerator cars) can be readily attached.

This invention possesses many other advantages, and has other objects which may be made more easily apparent from a consideration of several embodiments of the invention. For this purpose there are shown a few forms in the drawings accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawings.

Figure 1:
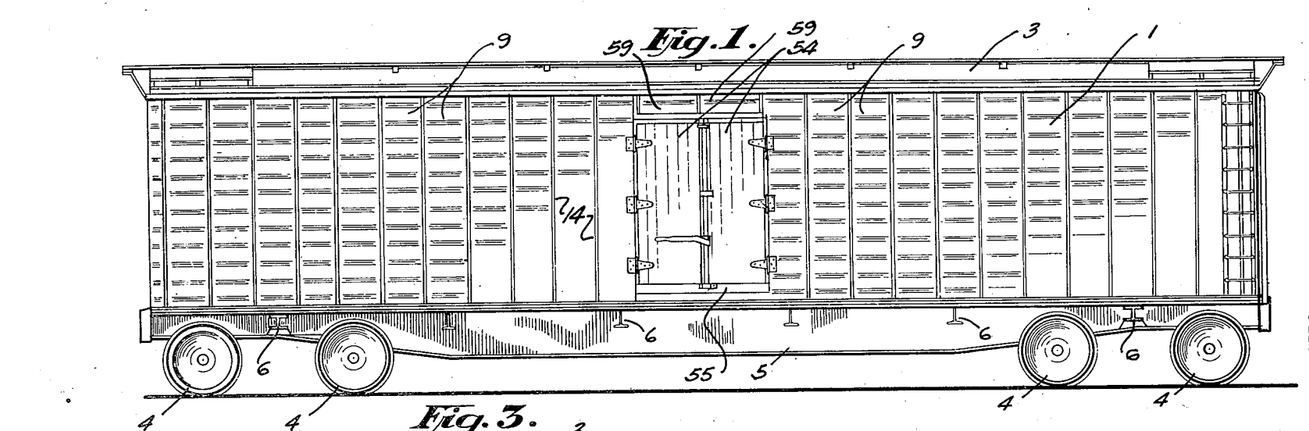
Figure 1 is a side elevation of a railway car in which the side and end walls are formed in accordance with this invention.
Figure 2:
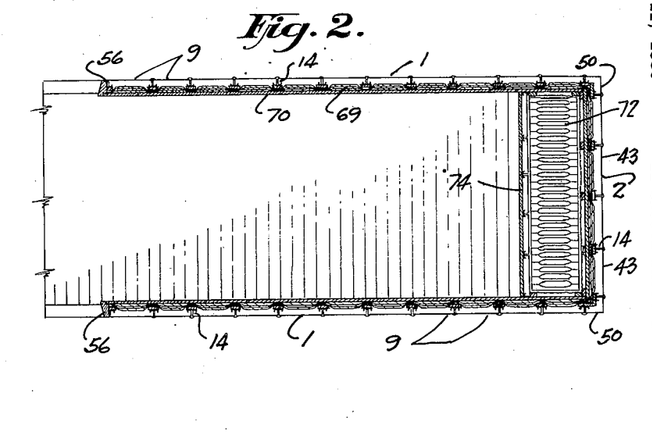
Fig. 2 is a fragmentary sectional view of a refrigerator car embodying the invention.
Figure 3:
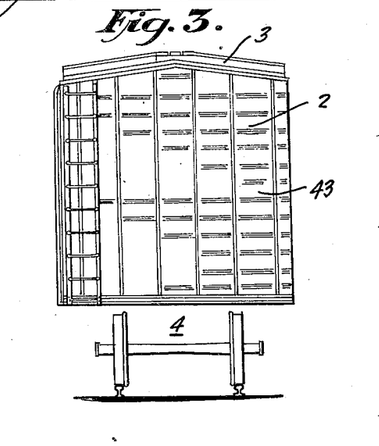
Fig. 3 is an end view of the car shown in Fig. 1.
Figure 4:
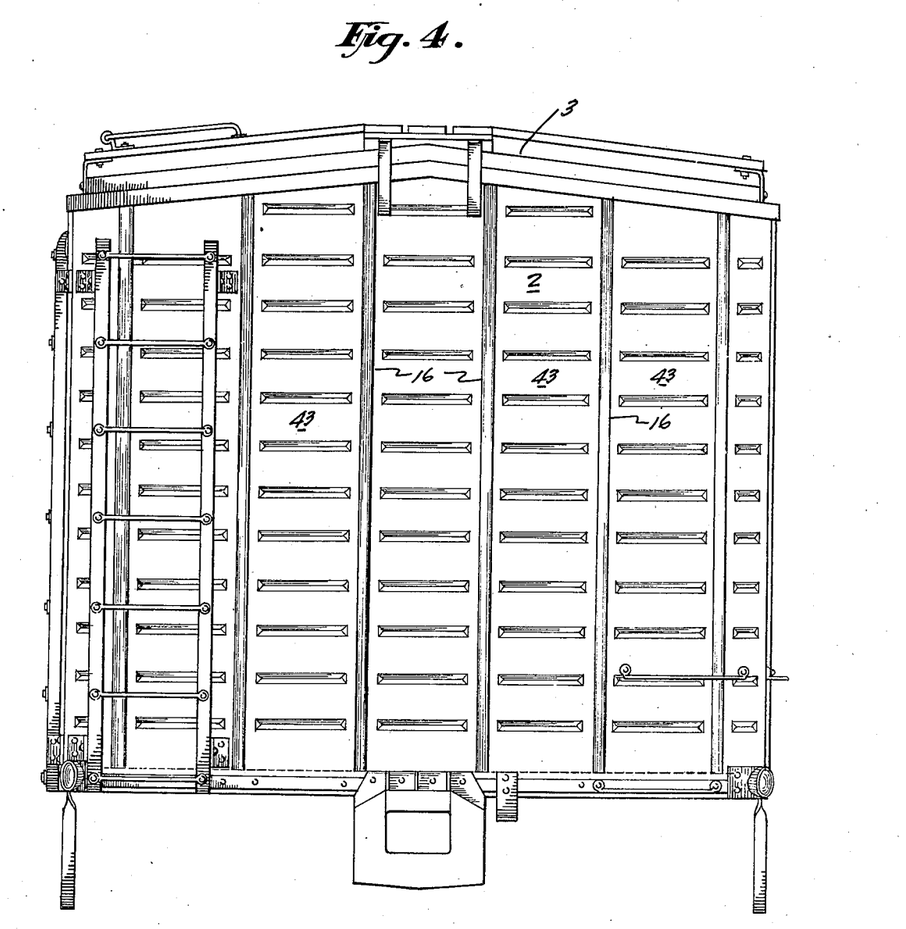
Fig. 4 is an enlarged end view of the superstructure of the car shown in Fig. 1.

The external appearance of a vehicle utilizing the invention is shown most clearly in Figs. 1, 3 and 4. In these figures, no attempt is made to show any detailed structure. Furthermore, in Figs. 3 and 4, the trucks are not indicated, as the invention involves mainly the superstructure.

This superstructure includes the side walls 1, and end walls 2. There is also a conventional form of roof structure 3.

Figure 5:
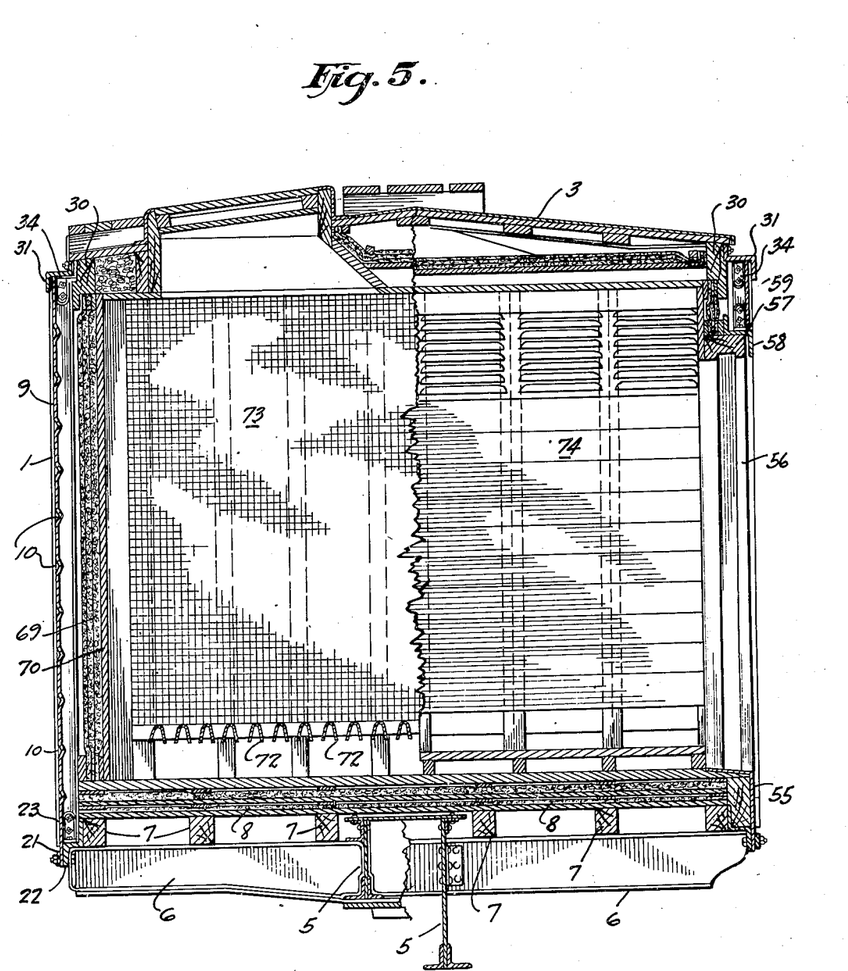
Fig. 5 is an enlarged transverse sectional view of the car shown in Fig. 1, half of the section being through the cargo compartment and the other half through the ice compartment.

In Figs. 1 and 3 the wheels are indicated generally at 4. The central beam structure 5 is shown in Figs. 1 and 5, as well as the transverse I-beams 6. Since all of this type of construction is standard and well understood, further description thereof is considered unnecessary.

Upon the substructure formed by elements 5 and 6, wood beams 7 (Figs. 5 and 15) can be placed to support a floor structure shown generally at 8. Those wood beams 7 which are at the extreme edges of the longitudinal structure form the floor sills for the car.

The manner in which metal units are formed and joined together to form the external side walls will now be described. In this connection reference is had particularly to Figs. 5, 6, 7, and 14.

Each of the side sections includes a thin metallic sheet 9 placed in substantially vertical position. Each sheet can be provided with a series of rather shallow depressions or corrugations such as indicated at 10 to provide stiffness. These sheets or sections are preferably made from some strong alloy, as an aluminum alloy or iron alloy. Each of them furthermore is provided with side flanges 11 turned at right angles to the vertical sheet 9. In the present instance these flanges are shown as integrally formed with the sheets 9, but of course other ways for forming these side flanges can be used. The sheets 9 forming the exterior wall units are made purposely narrow so that considerable rigidity is obtained by the aid of the side flanges 11. These flanges also serve the purpose of joining the adjacent sections together.

Figures 6, 7:
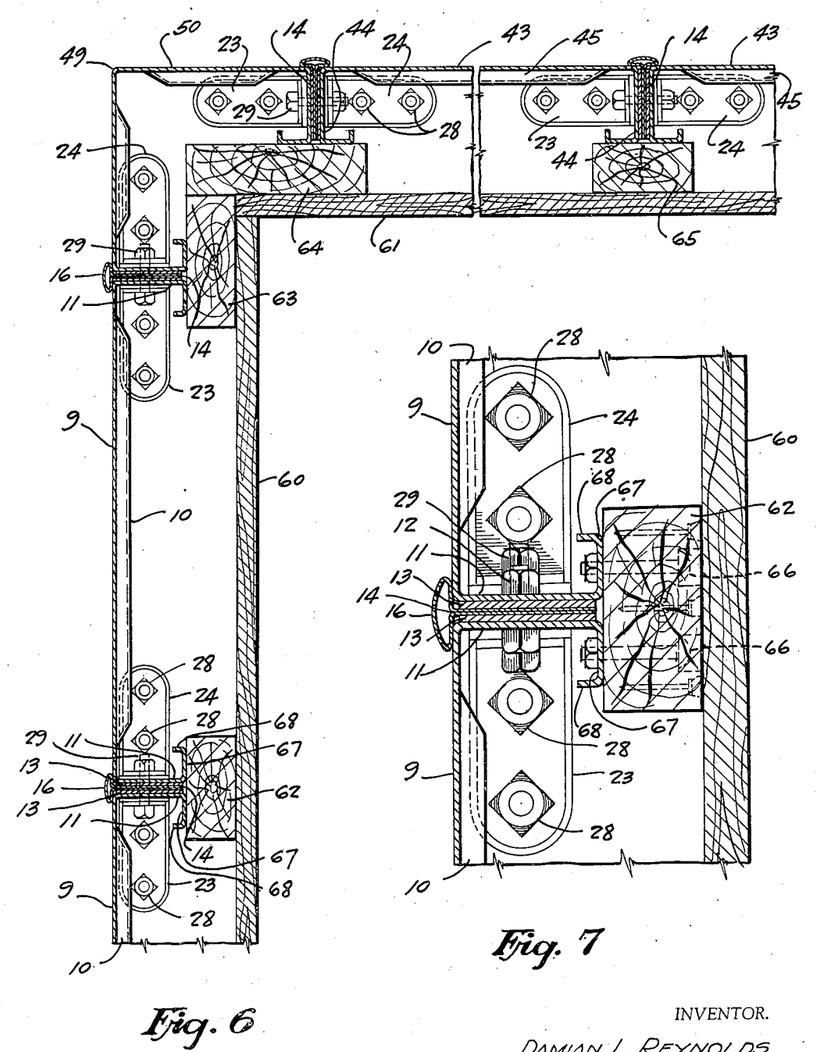
Fig. 6 is an enlarged horizontal sectional view of a portion of the side, corner, and end wall sections of a car embodying the invention.
Fig. 7 is an enlarged sectional detail illustrating the manner in which the units or sections are joined together.
Figures 12, 13, 17:
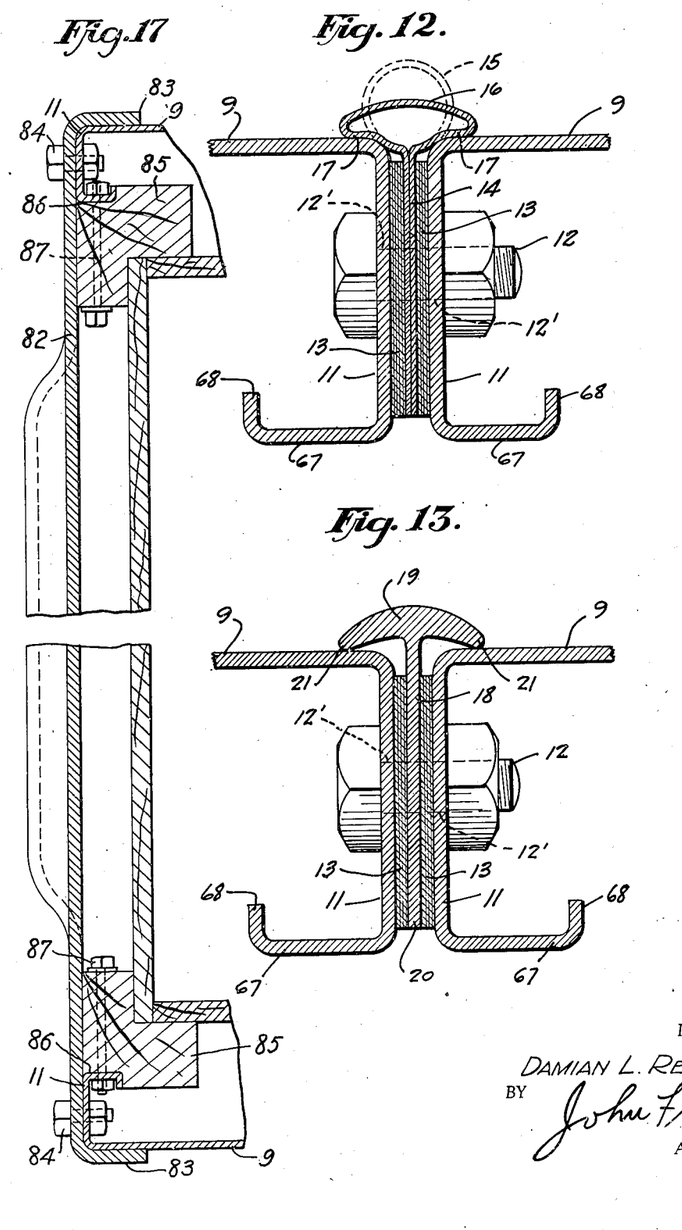
Figs. 12 and 13 are enlarged horizontal sectional sections of the abutting metal units illustrating two forms of the sealing strips disposed between abutting sections.
Fig. 17 is an enlarged horizontal sectional view of the end wall of a vehicle illustrating a single unit member for forming this end wall.

Thus as shown most clearly in Figs. 6, 7 and 12, bolts or other fastening means such as 12 can pass through appropriate apertures 12' in the flanges 11 for holding the adjacent sections together. In order to ensure against the entry of moisture into the vehicle, provisions are made for sealing the place where the two flanges come together. For this purpose, several strips 13 of such material as impregnated felt can be interposed between the flanges 11. These are sufficiently pliable and compressible so that when the bolts 12 are tightened, an efficient moisture seal is provided.

However, in order to ensure still further against moisture or other foreign matter from entering between the adjacent flanges, use is made of a sealing strip 14. This sealing strip is made of folded over elements as shown most clearly in Fig. 12, and interposed between the layers 13 of pliable material. Originally the two sections of the sealing strip can be joined by a cylindrical loop 15 shown in dotted lines in Fig. 12. After the sealing device has been assembled as shown in Fig. 12, the cylindrical portion 15 is flattened or swaged as by a hammer to assume the oval contour shown by reference character 16. There is sufficient resistance in this flattened-over portion so that the lower edges 17 are strongly and resiliently pressed against by the contiguous edges of sheets 9 due to these sheets being slightly deformed by the swaging of the portion 15.

In Fig. 13 an alternative form of metallic sealing strip is shown. In this case a T-section strip 18 is provided having an enlarged head 19. Normally the head 19 prior to the sealing operation is flat and perpendicular to the intermediate leg 20. For the purpose of sealing, the head 19 is hammered or swaged to the position shown in Fig. 13, the extreme edges 21 being thereby urged strongly and resiliently against the adjacent edges of the sheet metal sections 9.

Figure 14:
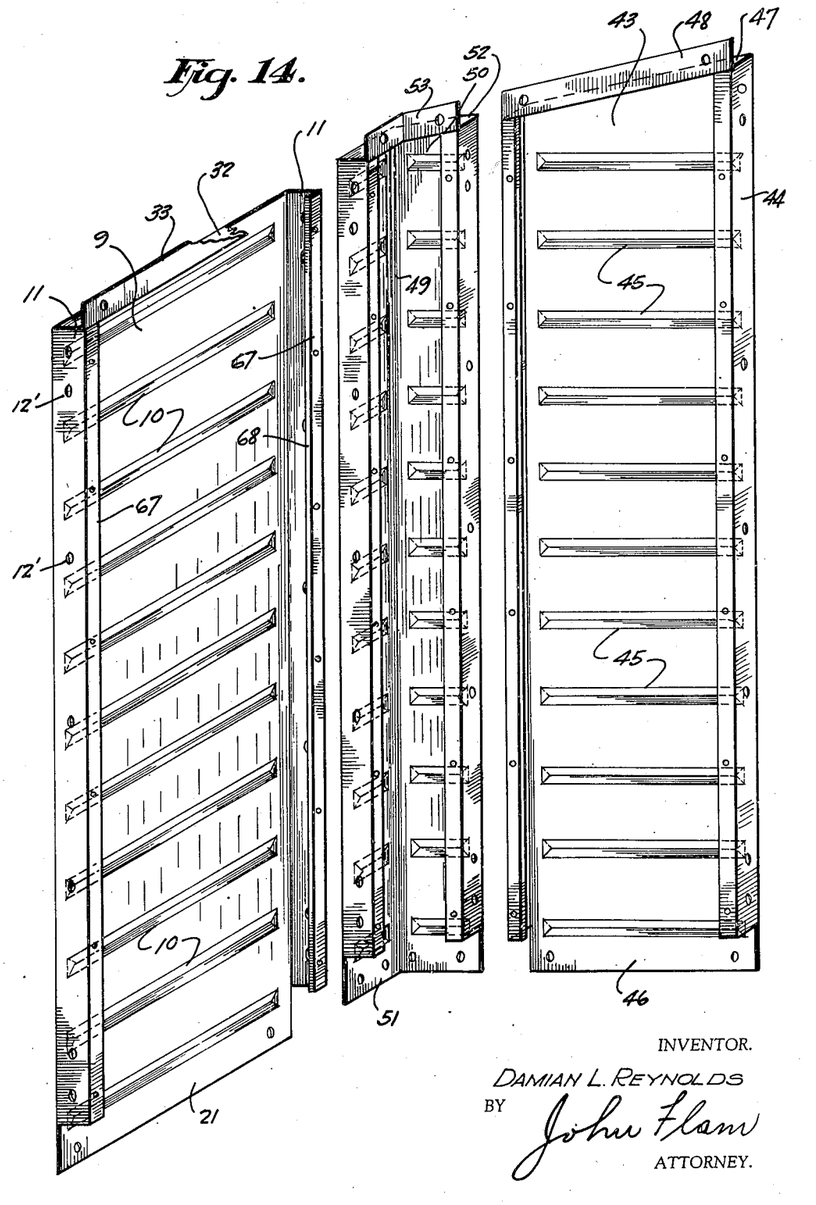
Fig. 14 is a perspective view illustrating in appropriate relationship, a corner unit and adjacent wall units.
Figures 15, 16:
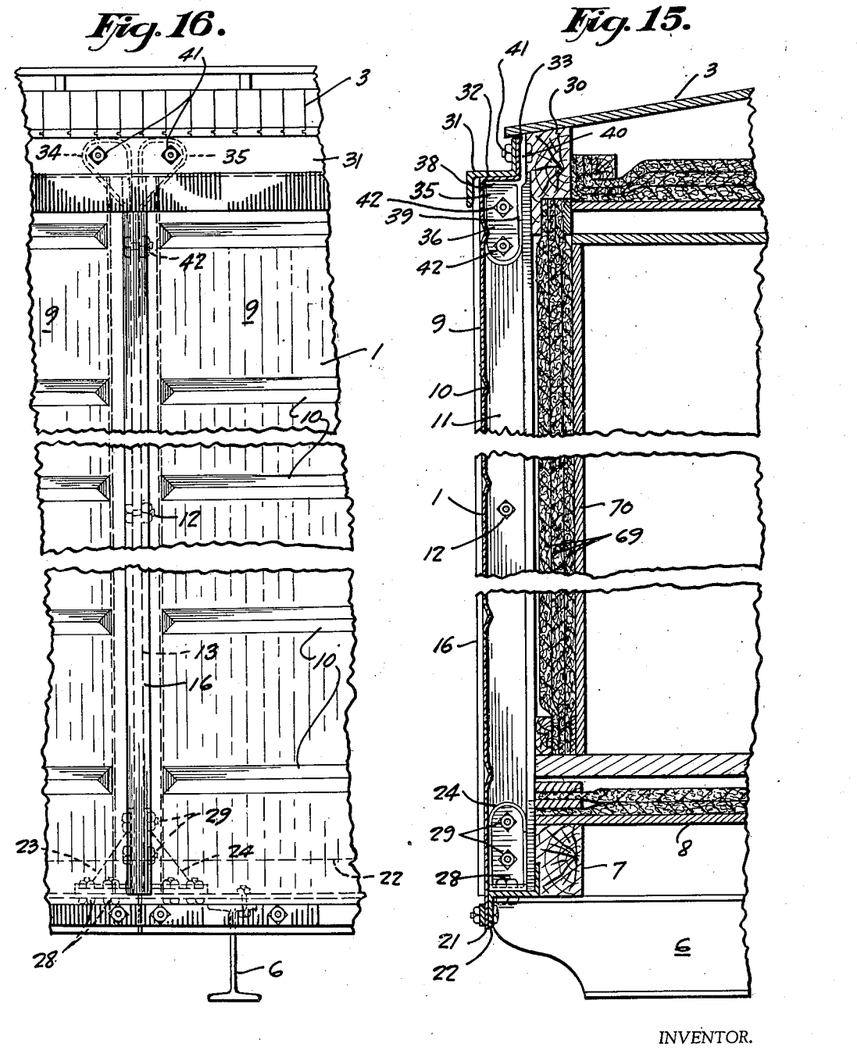
Fig. 15 is an enlarged transverse sectional view of a portion of the vehicle embodying the invention.
Fig. 16 is a fragmentary elevation of a portion of the vehicle shown in Fig. 15.

From this description it is clear how the metal sections can form a substantially continuous external metallic wall structure. In order to attach this wall structure at the bottom of the vehicle body, each metal unit is provided with a downwardly extending portion 21 (Figs. 5, 14 and 15). In the form shown in Fig. 5 this downwardly extending portion 21 is shown as attached to the metallic structural Z bar section 22. This section extends along the bottom edge of the vehicle structure. Its intermediate flange is placed in a horizontal position, one of the end flanges extending downwardly for connection with the extension 21. The other vertical leg of the member 22 extends upwardly and can be joined to the wood beam 7.

Figure 24:
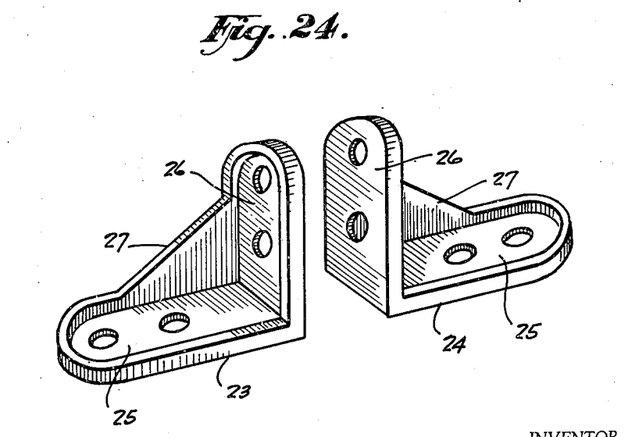

In order to provide further strength to the structure, foot supports 23, 24 (Figs. 5, 6, 7, 15, 16, 24) can be provided. These may be formed of castings or forgings and as shown most clearly in Fig. 24, each of them is provided with a bottom plate 25 and an upright portion 26, strengthened as by the vane or rib 27. The horizontal leg 25 can be fastened as by bolts 28 (Figs. 6 and 7) to the horizontal portion of the Z bar 22. The vertical leg 26 can be attached as by bolts 29 to the flanges 10 of the units. These foot members 23—24 are placed one at each lower corner of each of the units 9. The downwardly extending portions 21 of the sections or units 9, overlapping the vertical leg of the Z bar 22, serve effectively as a moisture seal.

The top edge of the sections 9 can be attached to the top longitudinally extending sill 30 as by the aid of a Z bar 31 (Figs. 5, 15, 16). The horizontal portion of this Z bar 31 is adapted to rest on the horizontal flanges 32 (Figs. 14 and 15) which are formed at the top of each of the sections. Joined to this horizontal flange 32 is a reflanged vertical portion or flange 33 offset from the vertical section 9 and disposed underneath the inner vertical leg of the Z bar 31. The downwardly extending vertical leg of this Z bar overlaps the top edges of the units. The Z bar 31 can be attached to the sill member for forming a support for the roof structure. It is apparent that this downwardly extending vertical leg of the Z bar 31 forms a flashing to prevent moisture from entering the interior of the vehicle.

Figure 23:
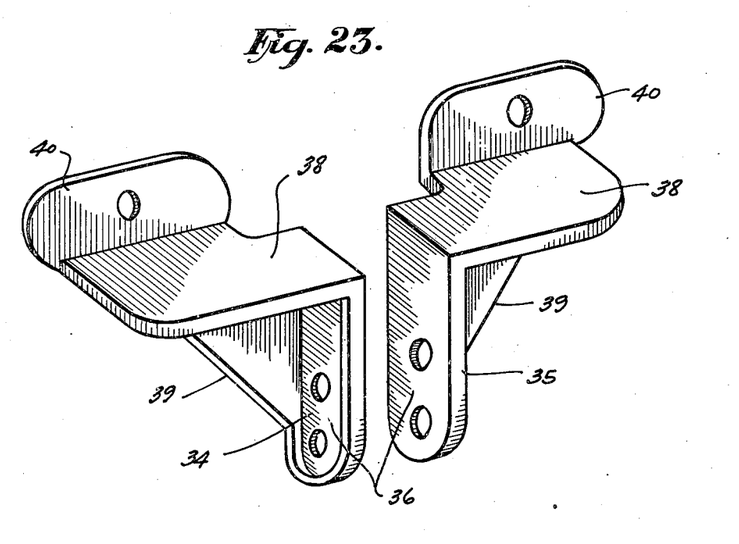
Figs. 23 and 24 are perspective views of the foot members or brackets utilized in the form of the invention shown in Figs. 15 and 16.

In order further to stiffen and fasten the tops of the sections 9 to the vehicle structure, foot members 34, 35 (Figs. 15, 16, 23) can be provided. These are in general of the same character as the members 23 and 24. They each have a vertical leg 36 fastened to the flanges 11; as well as horizontal portions 38 disposed immediately underneath the horizontal member of the Z bar 31. Appropriate ribs or vanes 39 can be provided to lend rigidity to the structure. Extending upwardly above the horizontal portion 38 of each of the members 35 is a vertical extension 40 contacting the inside of the vertical flange 33 of the sections 9. Bolts 41 serve to fasten the elements 40, 33 and 31 together; and bolts 42 serve to fasten the vertical portions 36 of the members 34 and 35 to the flanges 11.

The ends of the vehicle can also be formed by the aid of sheet metal sections of generally the same configuration as that described in connection with the side walls. One end section is shown most clearly in Fig. 14. This end section has the vertical portion 43 provided with the edge flanges 44 as well as the indentations or corrugations 45 to lend stiffness to the structure. The bottom edge of the section 43 has a downwardly extending portion 46 cooperating with an end Z bar similar to Z bar 22. The top portion of section 43 has an inwardly directed flange 47 and an upwardly directed flange 48, which however, are both at a slant in order to accommodate the sloping roof line. The manner of attachment however can be identical with that disclosed in Figs. 15 and 16.

Of course corner sections at each of the corners must be provided. Such a section is illustrated in Figs. 6 and 14. This corner section 50 is similar to the wall sections except that there is a right angled bend therein at the corner 49. The sealing strips and cooperating elements are of course interposed between each of the sections as heretofore described, and as clearly shown in Fig. 6. Furthermore, foot members 23, 24, are also provided in the bottom of these corner sections; and members such as 34—35 are also provided at the top, with appropriate changes to contact with the angled top flanges 47.

This corner section 50 is shown to best advantage in Fig. 14. The depending portion 51 serves the same purpose as the extending portions 21 and 46 of side and end sections. At the top of section 50, those portions 52 and 53 of the top flanges of course are slanting to provide the slanting configuration of the roof line.

Provisions for side doors are illustrated in Figs. 1 and 5. The side door structures 54 are shown as swung on vertical pivots. The threshold of the door opening can be formed by the threshold member 55. The sides of the door opening can be formed by the aid of flanges 11 of the adjacent sections 9, and these flanges can be overlaid with the wood door jambs 56. The top of the door opening can be similarly formed by a wood top piece 57. This wood top piece serves as a base for a short Z bar 58 corresponding in shape to the Z bar 22 at the side edges of the car. Upon this Z bar 58 are supported the units 59 of similar construction to the units 9 but considerably shorter, as they extend only from the top of the door opening to the bottom of the roof structure.

The manner in which exterior side and end wall sections can serve to support the inner walls is illustrated most clearly in Figs. 6 and 7. In this form the inner wall structures are formed by wood strips 60, 61. These wood strips serve to define the cargo space in the vehicle.

The strips 60, 61 are shown as attached to vertical wood members such as columns 62, 63, 64, 65, as by nailing or other appropriate fastening devices. These vertical columns are in turn attached as by bolts 66 to supplemental flanges 67 formed at the inner edges of the vertical flanges 11. In order to provide protection and additional stiffness to the structure, these supplemental flanges 67 can have turned in flanges 68.

Figures 8, 9:
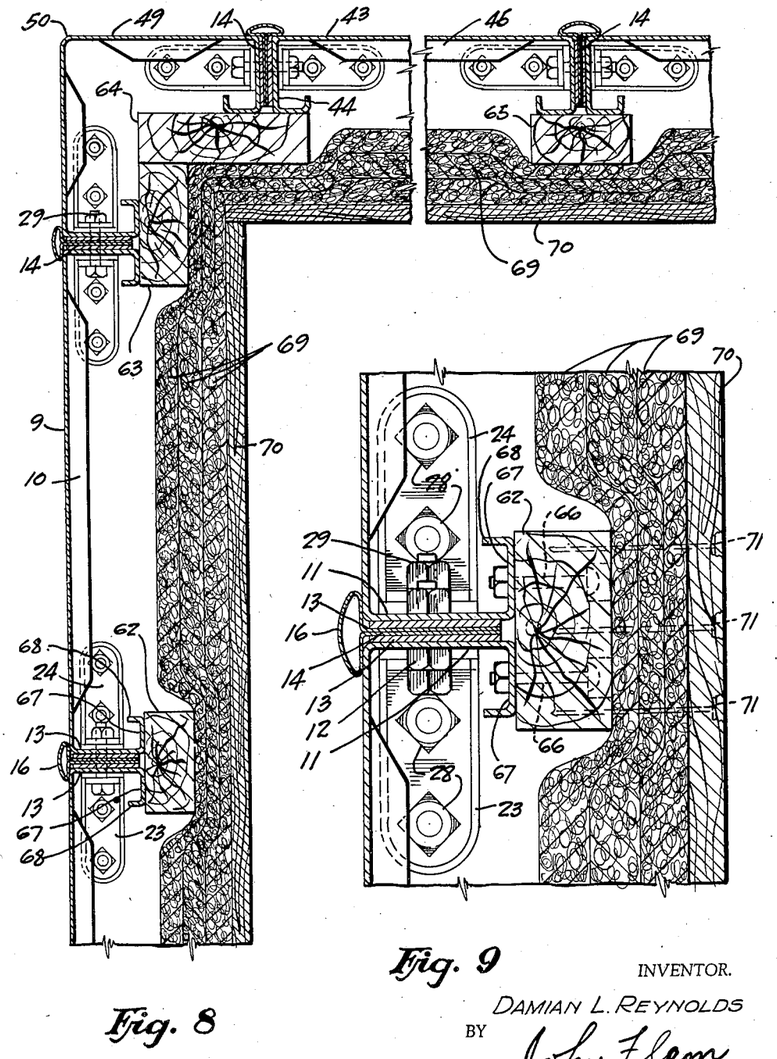
Figs. 8 and 9 are similar to Figs. 6 and 7 respectively, but illustrating the manner in which heat insulation material can be fastened to the inside of the wall sections.

In the form shown in Figs. 8 and 9 the vehicle is intended to be insulated against the transmission of heat into the cargo compartment as for example, when the vehicle is used as a refrigerator car. In this instance the vertical columns such as 62, 63, 64, 65, are attached to the flanges 67 as before. However, there are a plurality of layers 69 of heat insulation material such as hairfelt or the like, which is overlaid by a series of wood strips 70. The layers 69 and 70 are attached to the vertical posts or columns 62, 63, 64, 65, as by the aid of long nails 71. In Fig. 5 heat insulation materials are represented as extending not only along the sides but also at the bottom of the car; and the left hand portion of this sectional view represents the ice grates 72 and the screen 73 forming parts of the ice compartment. The right hand portion of the section of Fig. 5 shows the bulkhead construction 74 between the ice compartment and the cargo compartment.

Figures 10, 11:
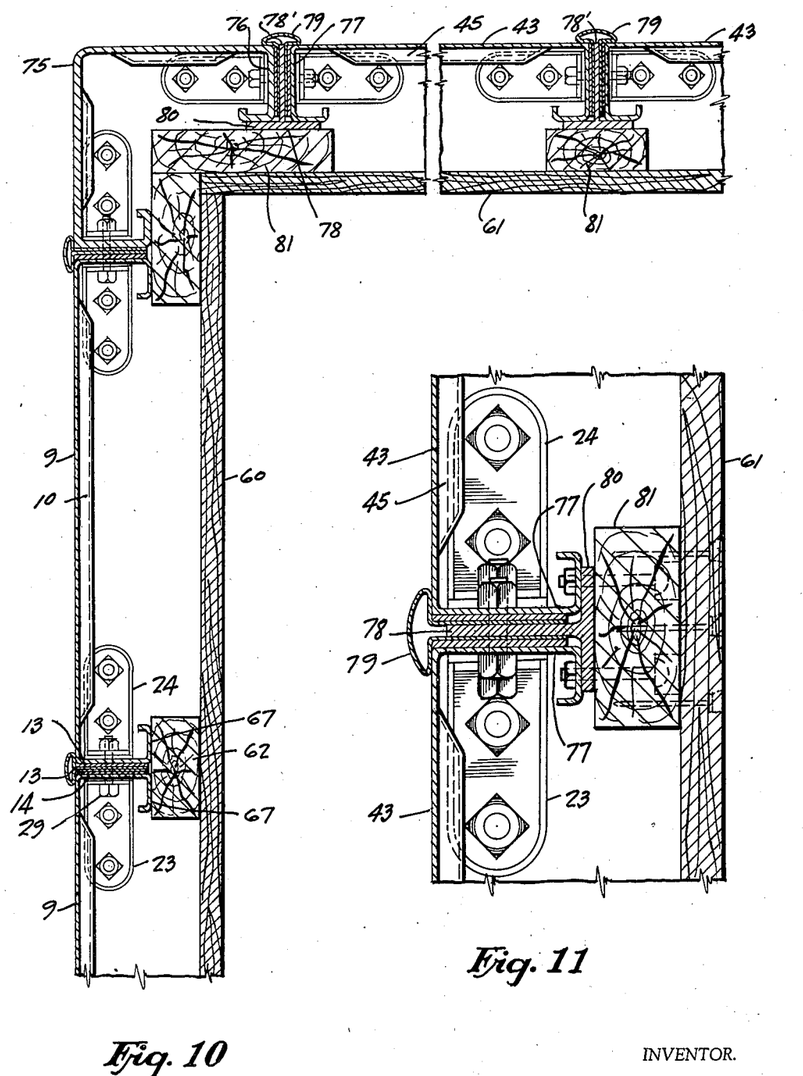
Figs. 10 and 11 are views similar to Figs. 6 and 7 but showing a further modification of the manner in which the sections are joined together.

In some instances it may be desirable to provide extra stiffness to the sections or units. One manner in which this can be accomplished is shown in Figs. 10 and 11. In this form the corner sectional unit 75 is shown as made from heavier gauge material than the adjacent sections. Furthermore, the columnar construction formed by the vertical flanges such as 76, 77 of the sections 75 and 43 can be reinforced by the aid of a T bar 78. This T bar has a central leg 78' disposed between the two sides of the seal strip 79. The head member 80 of the T bar 77 is positioned on the inside of the wall structure and is adapted to contact with the vertical posts such as 81.

An alternative mode of forming the end of the car vehicle is illustrated in Fig. 17. In this case there is but one end section 82 made of heavy gauge metal. This end section has vertical flanges 83 overlying the adjacent edges of the side sections 9. Furthermore, the end section 82 can be fastened directly to the flanges 11 as by the bolts 84. A corner vertical post or column 85 of special configuration can be provided at every corner. Thus it can be grooved to accommodate the narrow flange 86 turned inwardly of the flange 11, and can be fastened to this flange as by the aid of long through bolts 87.

Figures 18, 19, 20, 22:
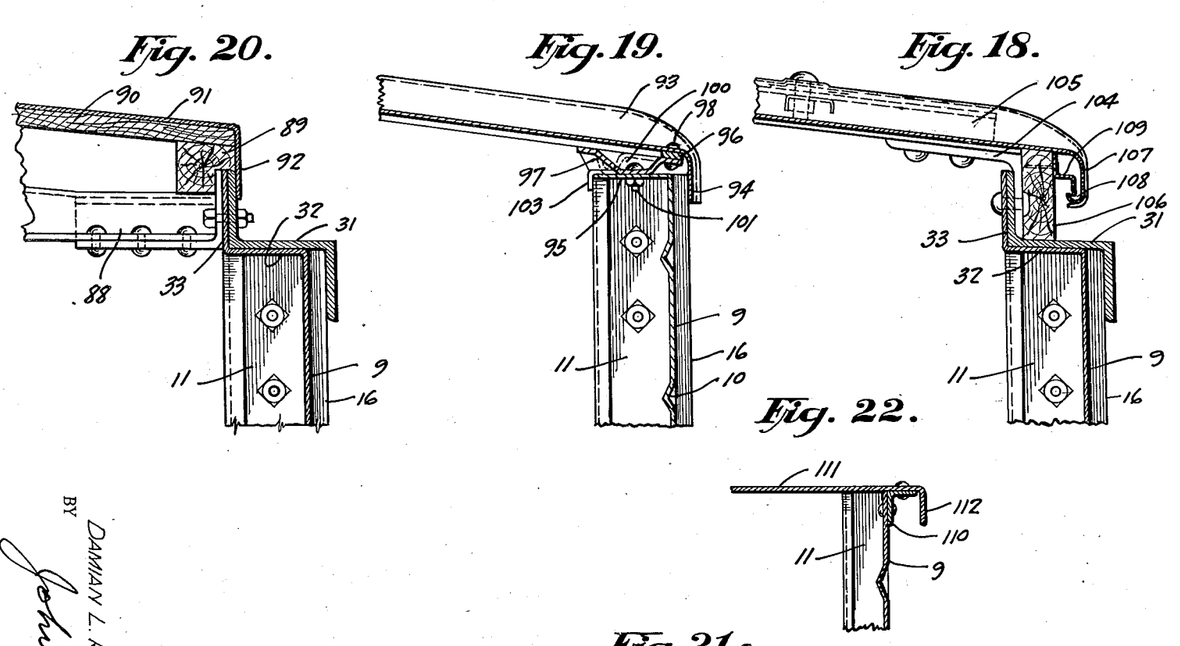
Figs. 18, 19, 20 and 21 are various detail sectional views illustrating how the side wall sections or units may be attached to the roof structure of the vehicle.
Fig. 22 is a plan view of a sheet metal strip used in the modification illustrated in Fig. 19.
Figure 21:
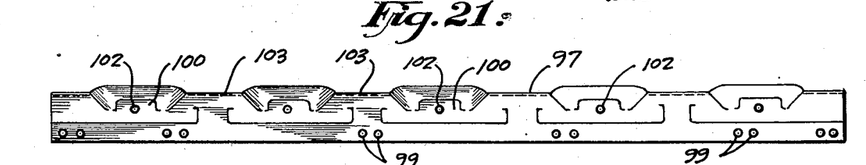

Various forms of roof structures are indicated in Figs. 20 to 22 inclusive. These figures illustrate the manner of joining the roof structure to the side wall sections 9. In the form shown in Fig. 20, the Z bar 31 overlying the flanges 32 and 33 at the top of the section 9, serves as an anchor for the cross brace structure 88. Upon this structure are secured the longitudinal beams 89 which in turn support the sloping roof structure 90. The top of the roof structure can be covered by a sheet member 91, having a depending flange 92 extending over the top edge of the Z bar 31.

In the form shown in Figs. 19 and 21, the roof structure is shown as formed of sheet metal units 93 having depending vertical flanges 94. These sheet metal units can have deep corrugations for lending strength to the structure. At its bottom surface the roof structure can be provided with a frame 96 for further strengthening the structure.

The top of the unit 9 in this instance is formed merely with a flat horizontal flange 95. Upon this flange is supported the roof structure units 93. This is accomplished by the aid of a longitudinally extending metal sheet strip 97 shown in Fig. 21. This metal sheet strip is riveted as by rivets 98, through apertures 99, to the roof structure 93. Spaced depressions 100 are formed in the sheet metal unit to accommodate the heads of bolts 101 passing through apertures 102 in the member 97.

At the inner edge of member 97 and intermediate the hollows or depressions 100 are depending flanges 103, extending over the back of the horizontal flange 95 of the sections 9.

It is apparent that in this form, the structure serves as a tie-in for the two sides of the vehicle.

A somewhat similar arrangement is illustrated in Fig. 18. In this form the section 9 has the horizontal flange 32 and vertical flange 33 overlaid by the Z bar 31. The upright flange 33 and the upwardly extending leg of Z bar 31 are fastened to the structural angle iron 104 upon which the corrugated metal roof structure units 105 are supported. Externally of the angle iron member 104 are the horizontal wood beams 106 serving as an additional support for the roof structure. The roof structure can be provided with a depending flange 107 providing a drip pocket 108. A flashing 109 of sheet metal can be fastened to the beam 107 to extend underneath the top overhanging portion of the roof structure, and into the drip pocket 108.

A simplified form of structure is shown in Fig. 22. In this form the units 9 are not provided with any integral flanges at the top; instead an angle iron 110 extends along the top of all of the units 9, and is fastened to these units. The horizontal leg of the angle iron 110 serves as the support for a roof supporting plate 111, having a depending flange 112. This depending flange 112 provides an eave structure.

I claim:

1. In a super-structure, including a roof structure, for a cargo car having an underframe, an exterior wall formed of a plurality of sheet metal sections with channel shaped sides and a vertical front surface with deformed portions to provide stiffness, means for connecting the adjoining sides of adjacent sections, a metallic sealing member between said sides adapted to be deformed to close the joint of the sides after assembly, the connected sides forming posts, said posts terminating on top of the under frame, brackets connecting the posts and the underframe, the front surface of the section extending below the top of the underframe and being secured to said underframe, and a continuous top member secured to the tops of said sections and adapted to support the roof structure.

2. In a super-structure, including a roof structure, for a cargo car having an underframe, an exterior wall formed of a plurality of sheet metal sections with channel shaped sides and a vertical front surface with deformed portions to provide stiffness, means for connecting the adjoining sides of adjacent sections, a metallic sealing member between said sides adapted to be deformed to close the joint of the sides after assembly, the connected sides forming posts, said posts terminating on top of the under frame, brackets connecting the posts and the underframe, the front surface of the section extending below the top of the underframe and being secured to said underframe, an inturned horizontal flange and reflanged vertical portion on the top of each section, a continuous top member secured to the vertical portion, and brackets connecting said posts and said top member, the top member being adapted to support the roof structure.

3. In a double walled super-structure including a roof structure for a cargo car having an underframe, an exterior wall formed of a plurality of sheet metal sections with channel shaped sides and a reentrant stiffening leg on the flange of said sides, the adjoining sides being connected to form the posts of the super-structure, a moisture seal between the connected sides, a nailing strip at each post substantially parallel therewith, means securing the nailing strip to the flanges of said post, an inside wall, means securing said wall to said posts, means to secure the exterior wall to the underframe, and a top member secured to the exterior wall and adapted to support the roof structure.

4. A double walled structure having outside and inside walls, the outside wall comprising a plurality of pressed metal sections, each with a substantially flat front surface with stiffening ribs formed therein and channel shaped sides, means connecting the adjoining sides to form posts, a metallic seal between connected sides having a head adapted to be deformed after assembly to close the joint between the sides, nailing strips secured to the flanges of the posts, and an inside wall secured to said nailing strips.

5. In an exterior wall structure, a plurality of sheet metal sections having side flanges and a horizontal top flange with a reflanged vertical portion, a continuous top member supported on the top of the sections, means connecting the adjoining side flanges to form posts, and brackets connecting said posts and said top member, the top member being adapted to support a roof structure, each of said brackets having a pair of legs substantially perpendicular to each other, one of said legs being adapted to be secured to a post, the other of said legs being adapted to support the top member and having a substantially perpendicular flange to which the top member is adapted to be secured.

6. In an exterior wall construction, a plurality of formed sheet metal sections with flanged sides, the sides abutting and adapted to be fastened together to form a wall of said section, a moisture seal for the joint between a pair of abutting sides consisting of a formed metal strip adapted to be inserted between said sides and having an outer cylindrical portion, the latter adapted to be flattened after assembly of the sections so as to contact the outer surface of the adjacent sections and to exert pressure against said surface, layers of pliable material between the sealing strip and the abutting sides, and means for fastening the sections together and for compressing said pliable material.

7. In a super-structure construction, having a roof structure, the combination of a series of formed sheet metal sections with flanged sides, the sides abutting and being fastened together to form a wall of said sections and a top plate member extending for substantially the length of the wall and adapted to be attached to the top of said wall, there being a series of depressions in said member to receive the attachment means, a continuous surface adjacent one of its edges as well as a discontinuous surface adjacent its other edge, said surfaces being coplanar and adapted to support the roof structure thereon and be secured thereto.

DAMIAN L. REYNOLDS.